May 4, 1926.

F. E. BESSEE

HANDLE OR GRIP

Filed April 13, 1925

1,583,270

Inventor
Frank E. Bessee
By Lyon & Lyon
Attorneys

Patented May 4, 1926.

1,583,270

UNITED STATES PATENT OFFICE.

FRANK E. BESSEE, OF LOS ANGELES, CALIFORNIA.

HANDLE OR GRIP.

Application filed April 13, 1925. Serial No. 22,708.

*To all whom it may concern:*

Be it known that I, FRANK E. BESSEE, a citizen of the United States, residing at Los Angeles, in the county of Los Angeles, State of California, have invented a new and useful Handle or Grip, of which the following is a specification.

This invention relates to a handle or grip, the purpose of which is to prevent unauthorized persons from moving the handle, where the handle is for controlling the operation of mechanism, or to prevent the handle to be lifted, with the article to which it is attached. The invention is capable of being applied to many situations, for example, to the steering wheels of automobiles, or to luggage handles. The general object of the invention is to provide a handle with simple means for preventing the handle from being used or operated by an unauthorized person; also to provide a device of this kind which is key-controlled.

In the embodiment of the invention disclosed in the specification, the device includes a guard having spurs which may be operated in such a way that they will project from the handle, and one of the objects of the invention is to provide simple mechanism for controlling the spurs, which will lock itself when the spurs are in their projecting position so that pressure upon the spurs or the guard plate carrying the spurs cannot operate to retract the spurs.

Further objects of the invention will appear hereinafter.

The invention consists in the novel parts and combination of parts to be described hereinafter, all of which contribute to produce an efficient handle or grip.

A preferred embodiment of the invention is described in the following specification, while the broad scope of the invention is pointed out in the appended claims.

In practice, the invention may be applied to a handle or grip which must be grasped in one's hand to operate or carry the object to which the handle or grip is attached. The improvement may be applied to an automobile steering wheel, but in the present specification it is described as applied to an ordinary luggage handle. In whatever situation the improvement is applied, the handle or grip is provided with a guard having spurs which are normally held in a folded or retracted position, and means is provided for moving the guard into the extended position so that the spurs project from the side of the handle.

Figure 1:
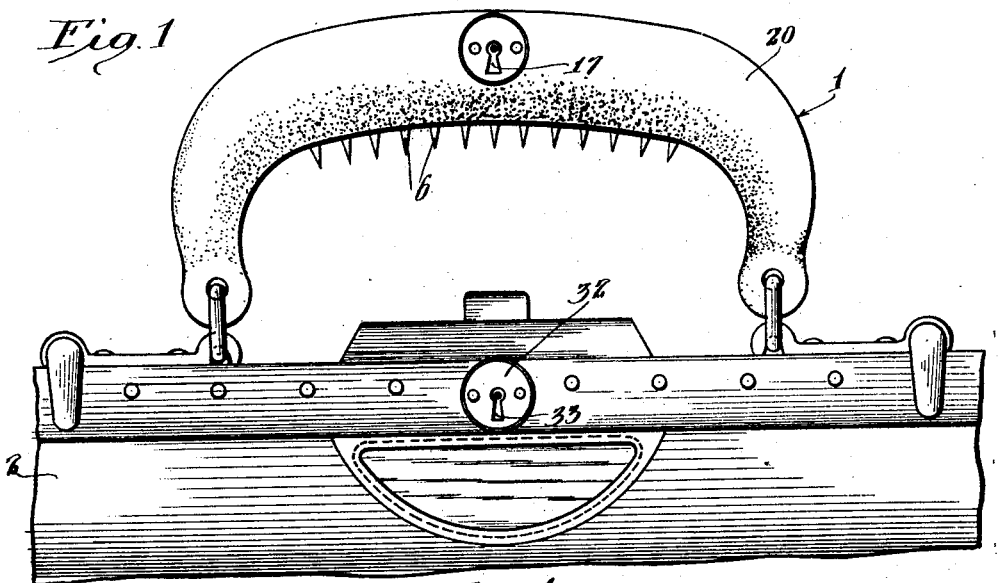
Fig. 1 is a side elevation showing the upper portion of a satchel having a handle to which my improvement has been applied.

When the invention is applied to a handle 1, such as illustrated in Fig. 1, carried by a bag or satchel 2, I provide a recess or chamber 3 extending longitudinally of the handle, and in this chamber or recess I mount a guard, preferably in the form of a guard plate 4, which extends longitudinally in the recess and which may be shaped so as to conform to the shape of the adjacent side 5 of the handle. In the present instance, this is the under side of the handle, and the lower side of the guard plate 4 is provided with a plurality of spurs 6 which may move down through openings 7 formed in the under side of the handle and in the bottom plate 8 which forms the bottom of the recess. The handle has laterally projecting ends constructed with means, such as illustrated, for attaching the handle to the satchel.

This guard is normally held within the recess, that is to say, in such a way that the points of the spurs 6 do not project beyond the under side of the handle, but I provide means, preferably key-operated, to enable the guard to be moved into its operative position at will. For this purpose, I provide at each end of the recess a toggle connection comprising a pair of toggle links 9, connected together by a pivot joint 10, the ends of the links 9 being pivotally attached at 11 and 12 respectively to the handle and to the guard plate 4.

The toggle joints 10 are connected by a bar 13 which extends longitudinally in the recess. The links 9 of one toggle connection extend substantially parallel with the links of the other toggle connection.

Figure 2:
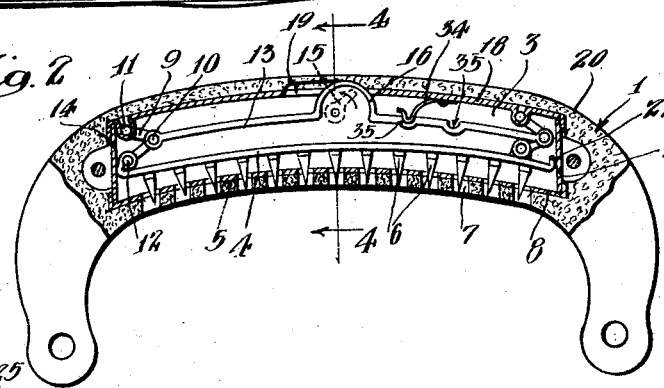
Fig. 2 is a side elevation of a handle with its middle portion broken away and shown in longitudinal section.
Figure 5:
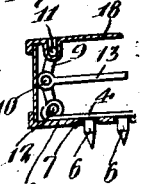
Fig. 5 is a longitudinal vertical section taken at one end of the guard, broken away, and particularly illustrating the means whereby the device is self-locking with the guard in its extended position.

In Fig. 2, the guard plate 4 is shown in its retracted position, at which time both toggle joints 10 will be disposed toward the right of the vertical line passing through the pivotal connections 11 and 12. By shifting the bar 13 toward the left, the toggle joints 10 may be moved beyond the "dead center" (see Fig. 5). This will bring the joint at the left end of the handle against the plate 14 which constitutes the adjacent end wall of the recess. This organization of the parts makes this mechanism self-locking when the guard is in its extended or operative position, because the spurs or the plate 4 cannot be moved in simply by exerting pressure upon them.

In order to enable the bar 13 to be operated by a key such as the key 15 (see Fig. 4) the middle portion of the bar is formed into an upwardly extending yoke 16.

Fig. 2 illustrates the manner in which the key operates the device and in this view the key 15 is illustrated in dotted outline. After inserting the key through the keyhole 17 on the side of the handle, the key would be rotated toward the left, as indicated by the arrow in Fig. 2. By doing this the ward of the key will strike against the inner side of the yoke 16 at the left and force the bar to the left.

If desired, the top plate 18 of the handle may be formed with a slot 19 to permit the upper portion of the yoke 16 to pass through, but the leather cover 20 of the handle should cover the yoke.

The end plate 14 and the opposite end plate 21 operate as guides for the ends of the guard plate 4, which may be provided with upturned flanges 22 at each end so as to assist in the guiding.

Figure 4:
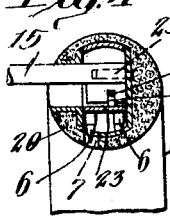
Fig. 4 is a vertical section taken about on the line 4—4 of Fig. 2, and particularly illustrating the manner in which a key may be employed for actuating the device, the stem of the key being broken away.
Figure 3:
Fig. 3 is a bottom plan view of the handle shown in Fig. 2.

At the point where the keyhole 17 is located, a small barrel 23 is provided, the axis of which coincides with the axis of the key, and the wall of this barrel is of cylindrical form and may be provided with circumferential ribs such as the rib 24 (see Fig. 4). When the key 15 is in position on the centering pin 25 which is received in the opening in the end of the key, a slot 26 in the ward of the key will align with the rib 24. This will prevent any other key except the proper one from unlocking the guard plate 4 when it has been placed in its extended or "locked" position. Of course, the position or number of these ribs 24 may be varied if desired, as is usual in key and lock construction.

Figures 6, 7:
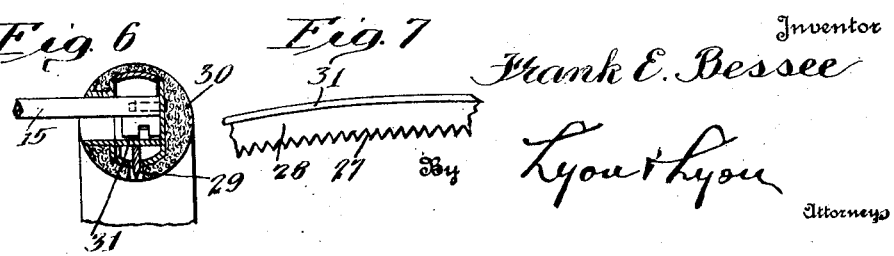
Fig. 6 is a view similar to Fig. 4, but showing a modified construction for the spurs of the guard and illustrating the actuating key.
Fig. 7 is a side elevation, broken away, and illustrating a short portion of the guard when constructed as illustrated in Fig. 6.

Instead of forming the spurs 6 as individual spurs or pins as illustrated in Fig. 2, I may form these spurs as serrations 27 formed at the lower edge of a plate 28, the said plate being guided through a slot 29 in the handle 30 (see Fig. 6). The upper edge of the plate 28 is attached to the under side of a horizontal guard plate 31 similar to the guard plate 4.

The key 15 which is used for the lock at the point 17 may be the same key which operates the regular lock 32 of the satchel, and which would be inserted at the keyhole 33.

Suitable means is provided for yieldingly holding the bar 13 in either of its extreme positions. For this purpose, I provide a spring 34 which may be carried by the wall of the recess, and the lower end of this spring is formed with a nose which may be received in either of two sockets 35 (see Fig. 2). When the bar 13 is operated to throw it into its extreme position toward the left, the nose of the spring would be received in the right hand socket.

When the guard device is in its extended position with the spurs 6 projecting as illustrated in Fig. 1, it would be impossible for a person to carry the satchel or suitcase by means of the handle because the spurs would penetrate the flesh and be very painful.

When the ward of the key engages the yoke 16 to shift the bar 13, of course it prevents the middle part of the bar from moving down immediately when its ends move down. The bar is resilient, and "springs" or "bows" enough to permit this.

It is understood that the embodiment of the invention described herein is only one of the many embodiments this invention may take, and I do not wish to be limited in the practice of the invention, nor in the claims, to the particular embodiment set forth.

What I claim is:—

1. A handle or grip having a guard with a plurality of spurs held in a folded position, and key controlled means for moving the guard into an extended position so that the spurs project from the side of the handle.

2. A handle or grip having means for securing its ends to a satchel, and having a body with a recess therein, a guard with a plurality of spurs normally held within the recess, and means for moving the guard into an extended position on the under side of the handle so that the spurs project beyond the outer face of the handle.

3. A handle or grip having means for securing its ends to a satchel, and having a recess extending longitudinally in its body, a guard in the form of a plate mounted in the recess and having a plurality of spurs, and means for moving the guard into an extended position on the under side of the handle with the spurs projecting beyond the side of the handle.

4. A handle or grip having a body with laterally projecting ends and having a longitudinally disposed recess, a guard in the form of a plate carried in the recess and having a plurality of spurs, and key-actuated means for moving the guard so that the spurs project from the under side of the handle.

5. A handle or grip having a body with laterally projecting ends and having a recess extending longitudinally therein, a guard with spurs normally carried within the recess, links connecting the handle to the guard at each end of the guard, and key-actuated means for actuating the links in unison to move the guard downwardly with the spurs projecting beyond the side of the handle.

6. A handle or grip having a guard with spurs normally carried within the handle, a pair of toggle links corresponding to each end of the guard and connecting the same to the handle, and a bar connecting the toggle links at one end with the toggle links at the other end and operating when moved longitudinally to move the guard outwardly with the spurs projecting from the side of the handle.

7. A handle or grip having a guard with spurs normally carried within the handle, a pair of toggle links corresponding to each end of the guard and connecting the same to the handle, and a bar connecting the toggle links at one end with the toggle links at the other end and operating when moved longitudinally to move the guard outwardly with the spurs projecting from the side of the handle, said bar operating when the guard has been moved outwardly to hold the toggle joints beyond their dead center, whereby the toggle links lock the guard in its extended position.

8. A handle or grip having a recess extending longitudinally therein, a guard with spurs normally carried within the recess, a pair of jointed toggle links corresponding to each end of the guard and connecting the same with the handle, a bar movable longitudinally within the recess and connected at its ends with the joints of the toggle links, said bar having a yoke at an intermediate point in a position to be actuated by a key to move the bar longitudinally.

9. A handle or grip having a recess extending longitudinally therein, a guard with supports normally carried within the recess, a pair of jointed toggle links corresponding to each end of the guard and connecting the same with the handle, a bar movable longitudinally within the recess and connected at its ends with the joints of the toggle links, said bar having a yoke at an intermediate point in a position to be actuated by a key to move the bar longitudinally, and means for yieldingly holding the bar in either of its extreme positions.

Signed at Los Angeles, California, this 4th day of April 1925.

FRANK E. BESSEE.